United States Patent [19]

Goodnight, Jr. et al.

[11] 4,072,670
[45] * Feb. 7, 1978

[54] LOY PHYTATE ISOELECTRIC PRECIPITATED SOY PROTEIN ISOLATE

[75] Inventors: Kenneth C. Goodnight, Jr.; Grant H. Hartman, Jr.; Robert F. Marquardt, all of Evansville, Ind.

[73] Assignee: Mead Johnson & Company, Evansville, Ind.

[ * ] Notice: The portion of the term of this patent subsequent to Nov. 30, 1993, has been disclaimed.

[21] Appl. No.: 735,489

[22] Filed: Oct. 26, 1976

[51] Int. Cl.² .............................................. A23J 1/14
[52] U.S. Cl. ................................ 260/123.5; 426/598; 426/655; 426/656
[58] Field of Search ...................................... 260/123.5

[56] References Cited

U.S. PATENT DOCUMENTS

| 2,887,395 | 5/1959 | Rowe et al. | 260/123.5 X |
| 3,736,147 | 5/1973 | Iacobucci et al. | 260/123.5 X |
| 3,995,071 | 11/1976 | Goodnight et al. | 260/123.5 X |

FOREIGN PATENT DOCUMENTS 559,848   3/1944   United Kingdom.

Primary Examiner—Walter C. Danison
Attorney, Agent, or Firm—R. E. Carnahan; R. H. Uloth

[57] ABSTRACT

Soy protein isolate having a greatly reduced content of phytic acid and phytate complexes and high nutritional quality is prepared by aqueous extraction of defatted soy flakes at a pH in excess of the isoelectric value of the protein, basification of the extract to a pH in excess of pH 10.5, and removal of insolubles. The soy protein is then precipitated from the clarified extract by acidification within the isoelectric range.

24 Claims, No Drawings

LOW PHYTATE ISOELECTRIC PRECIPITATED SOY PROTEIN ISOLATE

FIELD OF THE INVENTION

This invention is involved with seed protein isolation adapted for food use.

DESCRIPTION OF THE PRIOR ART

The prior art has dealt extensively with the subject of isolation, purification and improvement of the nutritional quality and flavor of soybean protein. Soybean protein in its native state is unpalatable and has impaired nutritional quality due to the presence of phytic acid complexes which interfere with mammalian mineral absorption, and the presence of antinutritional factors including trypsin inhibitors which interfere with protein digestion in mammals. The prior art has dealt with the destruction of trypsin inhibitors by heat treatment and with the removal of phytic acid. It has also dealt with improving the yields of protein secured as purified isolate relative to that contained in the soybean raw material.

McKinney, et al., J. Biol. Chem., Vol. 178, pages 117-132 (1949) disclose that phytin slowly dissociates from soybean protein in alkaline dispersions at pH 11.0 to pH 11.5 and may be removed by centrifugation.

Iacobucci, et al., U.S. Pat. No. 3,736,147 patented May 29, 1973 disclose an ultrafiltration process for the preparation of soy protein isolate having a reduced phytic acid content which involves various chemical treatments in combination with extensive ultrafiltration. Chemical treatment involves either enzymatic hydrolysis of the phytic acid by the enzyme phytase at neutral pH prior to ultrafiltration, ultrafiltration in the presence of calcium ion at low pH, or the use of ethylenediaminetetraacetic acid at a high pH.

Bolley, et al., U.S. Pat. No. 2,732,395 patented Jan. 24, 1956, disclose a method for separation of phytin from various oil seeds. The method involves acid extraction of an oil free seed meal or flour with aqueous acid at a pH within approximately the isoelectric range of the particular seed protein, generally about pH 4.5. The phytin is recovered from the soluble portion and the protein is recovered from the curd by extraction at a pH greater than 8 with separation of insoluble materials, and subsequent coagulation of the protein in the clarified alkaline extract by acidification, again within the isoelectric range of the protein. The method is applied to various oil seeds including defatted soybean flour to provide purified protein which is allegedly substantially free from organic phosphorous compounds.

Sair, U.S. Pat. No. 3,001,875 patented Sept. 26, 1961, involves aqueous extraction of defatted soy flakes at pH 6-10.5 to form a solution of the soy protein, removing insoluble materials, precipitating the extracted protein at pH 4.5, redissolving the curd at pH 6 and drying.

Johnson, U.S. Pat. No. 3,397,991 patented Aug. 20, 1968, forms a protein isolate from a mixture of solvent extracted vegetable meals including soy meal to provide the desired amino acid composition in the resulting protein isolate by colloidally solubilizing the protein in water at 150°-200° F. and at a pH of 9-12, separation of insoluble materials and recovering the solubilized protein from the aqueous solution by drying or by acid precipitation within the isoelectric range.

Robbins, et al., U.S. Pat. No. 3,261,822 patented July 19, 1966, illustrates preparation of a soy protein isolate by extracting defatted soy flour with water at an acidic pH, pH 3.5-5.5, discarding the soluble material, and redissolving the protein curd in water at pH 6-11.

SUMMARY OF THE INVENTION

The present invention provides a process for the preparation of an improved purified soy protein having exceptionally low phytic acid content, substantially improved palatability, improved functionality, high nutritional quality, and low ash content. Phytic acid, the hexaorthomonophosphate ester of myo-inositol, occurs at fairly high levels in grains and oil seeds as the calcium magnesium salt, phytin. In soybean meal roughly 70% of the total phosphorous is accounted for by phytin. Based on an 0.6% phosphorous content of defatted soybean meal, approximately 2% by weight of phytin is calculated to be present in defatted soybean meal. During the preparation of isolates and concentrates much of the phytic acid and phytates remain associated with the protein in the form of complexes. When the terms phytate or phytates are used herein, it is intended to include salts of phytic acid or molecular complexes of phytic acid with other soybean constituents. In the case of presently available commercial soybean protein isolates, a phosphorous content of 0.7-0.8% is usual indicating that as much as 2-3% by weight of the isolate is phytin. Phytate removal from soy protein isolate and concentrates is desirable because phytin phosphorous appears to be unavailable as a nutritional entity to monogastric animals, and it interferes with the absorption of nutritionally essential multivalent cations such as calcium, iron and zinc.

In its broadest concept, the invention involves forming an aqueous solution of soy protein at pH 10.6-14 by aqueous extraction of a soybean material containing soy protein which has not previously been contacted with acid. A preferred source of soy protein is defatted particulate soybean such as defatted soy flour or defatted soy grits or flakes. This treatment results in separation of the phytic acid constituents from the protein and precipitation thereof as insoluble phytates. Prior contact of the native soybean material with acid results in the formation of a bond between the phytate and the protein which is stable at pH 10.6-14 and renders isoelectric or acid treated soy protein raw materials inappropriate for the present invention.

The residual extracted flakes and insoluble phytates are then separated from the soy protein solution by filtration or centrifugation, and thereafter the soy protein is precipitated by acidification within the isoelectric range of the proteins, and the precipitate is recovered. Optional steps include heat treatment following redissolution of the recovered protein to form an aqueous solution having a pH in excess of the isoelectric range. The latter may be dried or formulated as such with additional nutritional ingredients into a liquid dietary product.

The present invention is based upon our discovery of a basic flaw in prior art processes for the preparation of acid precipitated soy protein isolate as exemplified in the Bolley, et al. and Robbins, et al. patents cited above. The prior art has precipitated the soy protein in the flake with acid in the presence of phytic acid. We have found that an alkali stable complex is formed between the protein and the phytic acid under these circumstances which prevents dissociation of the phytin from the soybean protein in alkaline pH's as is disclosed in the McKinney, et al. article cited above.

DETAILED DESCRIPTION OF THE INVENTION

A four- and optionally five-step process forms the nucleus of the present invention. The raw material for the process is particulate defatted soybean, preferably defatted soy flour or defatted soy flakes. Step (a) of the process involves forming an aqueous solution of soy protein at pH 10.6–14 from a soy protein containing raw material as has been mentioned. The soy protein solution is preferably formed by aqueous extraction of defatted particulate soybean at a pH in excess of the isoelectric value of the soy protein. Water or an aqueous alkaline solution may be used for extraction. Soy protein sources which have been previously contacted with acid or at the isoelectric value of the soy protein are not suitable. Except for the exclusion of acid treated raw material, it is not intended to limit the invention to any specified manner of preparing this initial soy extract since many modifications may be made depending upon the various objectives of the process.

If the objective of the initial extraction is to secure the maximum recovery of protein in the extract, larger amounts of extract water or alkaline solution are employed and the solids may be removed by centrifugation and re-extracted. Where residual solids are to be used for animal feed, it may be desirable to conduct a less thorough extraction or to omit washing of the solids after removal from the supernatant liquid. Similarly, times and temperatures are varied to suit the particular operating purposes and equipment, but it is preferred to limit the exposure of the protein to highly alkaline pH values as is described below in order to avoid chemical degradation of the protein. In any event, the initial extraction slurry contains from about 1 to 30% by weight of soybean solids, preferably 2.5 to 20% thereof, and more preferably 6–12%.

When the initial extract is formed, for instance, at pH 7–9 as is preferred according to one embodiment of the invention, then the pH is adjusted to within the range of 10.6–14, preferably pH 11–12 and more preferably pH 11.4–11.8 prior to separation of the solids in order to disrupt the soluble phytic acid soy protein association which exists in extracts prepared at pH's below pH 10.6. This results in insolubilization of the phytate and phytic acid which are then separated by conventional solid separation techniques such as centrifugation or filtration. Sodium hydroxide, potassium hydroxide, or other non-toxic water soluble bases which are suitable for food use but compatible with the soy protein may be used for basification. Alkaline earth metal hydroxides such as barium hydroxide or calcium hydroxide under some conditions of use cause precipitation of the soy protein.

The temperature during phytate separation by alkaline treatment in Step (a) should preferably be done above 10° C., for instance 10° to 50° C. or 15° to 30° C. It has been found that removal of phytate is incomplete but, nevertheless, significant at temperatures of less than 10° C. following alkaline treatment at pH 11–12. At 10° C., approximately one-half of the phytate is removed, while at 20° C., 90% of the phytate is removed, and at 30° C., more than 99% removal is effected. The foregoing temperature ranges are the optimum values for dissociation of the soluble soy protein phytic acid complex and for rendering of the phytates and phytic acid derivatives insoluble. Under some manufacturing conditions, however, other temperature ranges may prove to be more suitable since the temperature at which the phytate precipitate is formed has an effect on the physical nature thereof which affects its filtration and centrifugation characteristics. Empirical selection of the optimum phytate insolubilization temperature for any given manufacturing arrangement is desirable. Optimum values usually fall within the range of 15° to 30° C. At temperatures in excess of 50° C. the tendency for hydrolysis of the protein, and for the formation of undesirable protein reaction products increases, and higher temperatures are thus to be avoided.

The time of exposure of the soy protein containing extract to aqueous base in the range of pH 10.6–14 during phytate precipitation should be limited according to the temperature employed so that substantial loss in protein quality does not occur. A convenient way to ascertain this is to determine the cysteine analysis of the protein since cysteine is the most sensitive of the amino acids to loss from the soy protein under the alkaline conditions employed. It has been found that at pH 11 and at temperatures in the range of 20°–30° C. essentially no loss of cysteine occurs during periods of up to 6¾ hours. However, at pH 12, significant loss of cysteine occurs within 2¾ hours at 40° C. At 20° C. and pH 12 the loss of cysteine is not believed to be significant during 2¾ hours, but after 6¾ hours, approximately 15% of the cysteine is lost. Accordingly, a period of up to about ½ hours for phytate precipitation is recommended, but longer periods are satisfactory when operating at the lower end of the pH range of about pH 11. At pH values of 12 and higher careful limitation of the time of exposure to the alkaline medium should be exercised by monitoring the content of the amino acid cysteine.

In summary, the duration of exposure of the alkaline aqueous extract of soybean material in the range of pH 10.6–14 for the purpose of phytate precipitation should be chosen so that under the conditions of pH and temperature employed the duration of exposure is such that not more than about 10% of the cysteine of the soy protein containing extract is destroyed. Treatment conditions resulting in substantially more cysteine destruction than 10% are regarded as inappropriate since one of the objects of the present invention is to provide a soy protein isolate of improved nutritional quality which purpose is defeated by degradation of the soy protein and loss of certain amino acid values, particularly cysteine.

Step (b) involves separation of the spent flakes and of the insolubilized phytates and phytic acid from the extract. Conventional solid separation unit processes may be employed such as centrifugation or filtration. The clarified aqueous extract produced in Step (b) is most convenient for further processing if it contains from 1–12% by weight of protein, 1–10% by weight of carbohydrate, and from 0.3 to about 3% by weight of impurities including mineral constituents reported as ash on combustion of a specimen. Due to the nature of the starting material employed the extract contains little fat, usually about 0.1%, but in any event less than 1%. If extracts are prepared containing more than about 12% by weight of protein, they are generally found to be viscous and both inconvenient to handle and inefficiently processed in the centrifugation or filtration, and washing steps.

As to the alkaline treatment in Step (a) it has been found that the phytate content of the extract drops abruptly following treatment at pH's in excess of 10.5 due to disruption of the protein-phytate complex and precipitation of the phytates. At pH 10.6 an extract is produced having a phytate content of about 1 g./100 g. of solids in the extract. At pH 11.0 the phytate content of the extract is about 0.05 g./100 g. of solids in the extract. As the pH is increased, the tendency to hydrolyze the protein and effect condensation through the sulfur containing amino acids increases. Thus, while phytate removal is efficient at all pH values in excess of 10.6, it is preferred to operate in the range of about pH 11-12 to avoid as much as possible a loss in protein equality due to hydrolysis or condensation of sulfur containing amino acids. When the term "soy protein isolate having low phytate content" is employed herein, what is intended is a soy protein product containing about 88% or more by weight of soy protein and less than 1% by weight of phytates (expressed as phytic acid equivalent), preferably less than 0.5 g. phytates per 100 g. protein, and more preferably less than 0.3 g. phytates per 100 g. of protein.

Steps (c) and (d) of the process are carried out in conventional fashion for the precipitation and recovery of a protein from aqueous solution at its isoelectric point. The proteins of the soybean have isoelectric points within the range of pH 4 to pH 5 and more specifically at pH 4.5 to pH 4.7. The phytate-free clarified extract produced in Step (b) is then simply acidified to a pH within the isoelectric range of the soy protein by treatment with a non-toxic water soluble acid which does not interact as such with the soy protein and the precipitated protein is collected in conventional fashion such as by decantation of the supernatant liquid, filtration, or centrifugation. The object in removing this supernatant liquid, of course, is to eliminate the undesirable soluble soybean carbohydrates. Any means known to the art for the recovery of the precipitated protein may be employed.

The separated and precipitated protein may be washed with water and dried or it may be resuspended in water, the suspension wet milled, and then spray dried or lyophilized. Alternatively, the precipitated and separated protein may be redissolved in dilute aqueous solution at a pH in excess of the isoelectric range and the resulting solution spray dried as is known to the art for the production of so-called soy proteinates.

Finally, rather than spray-drying, the precipitated and separated protein may be redissolved at a pH in excess of the isoelectric range, and the resulting soy proteinate solution may then be formulated without drying into a liquid dietary product by combination with the desired carbohydrate and fat ingredients and if desired, vitamins, minerals, flavors, etc. This is not only a convenient mode of operation from the standpoint of combining the various ingredients, but also it affords a liquid dietary product having improved functional characteristics such as solubility, suspendability, viscosity, mouth feel and emulsion stability. for this purpose, it is preferred to redissolve the soy protein curd after acid precipitation in Step (c) in aqueous solution at a pH in excess of the isoelectric range, but at a pH which is suitable for the final formulation, for instance, for a soy milk at a pH of about pH 6.5 to pH 7.5.

A modification of the process constituting a 5th and optional step involves short-term high-temperature heat treatment of the soy protein product of Step (d) after dissolution thereof in dilute aqueous alkali at a pH of less than 10 but greater than the isoelectric value of the soy protein, for instance pH 6-10 and preferably pH 7.0. The solution preferably has a solids content of about 5-8% by weight. Following heat treatment, the resulting solution may be dried by any suitable means such as lyophilization or spray drying or it may be incorporated by mixing with other nutritional ingredients to provide a liquid dietary product. Heat treatment improves the nutritional quality and functionality of the product.

The time and temperature conditions which are operable for heat treatment do not lend themselves to precise definition, but those skilled in the milk treatment and soy protein extraction arts will have no difficulty in selecting optimum conditions for the particular manufacturing facilities which are available. Broadly speaking, the higher the temperature employed, the shorter the time of treatment with the maximum temperature presently considered applicable being about 175° C. for a period of about 1 second. When lower temperatures are employed, longer time periods of treatment are necessary, for instance 60° C. for about 30 minutes has substantially equivalent effect to 175° C. for 1 second. Other suitable times and temperatures include 140° C. for 45-60 seconds, and 100° C. for 10 minutes. The preferred heat treatment conditions for a given application of the process are determined empirically and adapted to the available equipment by evaluating the performance of the soy protein isolate when heat treatment of the clarified extract is carried out for different time periods and at different temperatures. For some purposes, one set of heat treatment conditions may be preferred while another set may be preferable when the resulting soy protein isolate is to be used for a different purpose. In any event, the conditions are selected to achieve one or both of the following results:

(i) to improve the protein efficiency ratio of said protein isolate produced in Step (d), or
(ii) to improve the functionality of said protein isolate produced in Step (d) when incorporated into a liquid dietary product as measured by sedimentation index, nitrogen solubility index, or emulsion stability index.

DESCRIPTION OF SPECIFIC EMBODIMENTS

Experiment 1. Improved Low Phytate Soy Protein Isolate

Defatted soy flakes, 1 kg., are mixed with 16.1 water and the pH of the mixture is adjusted to pH 9.0 with 12.5 N sodium hydroxide. The mixture is stirred with pH monitoring at pH 9.0 for 1 hr. at room temperature (24° C). The insolubles are then removed by centrifugation for 20 min. at 3,650 × G. A 4 kg. aliquot of the extract is then adjusted to pH 11.6 and maintained at this pH for 15 min. while the mixture is stirred. This treatment results in precipitation of most of the phytic acid components of the extract which are then removed from the alkaline extract by centrifugation at 5,800 × G for 1 hr. at 20°-25° C. The supernatant liquid is collected and adjusted to pH 4.5 with 1 N hydrochloric acid. The precipitated soy protein isolate is collected by centrifugation at 3,650 × G for 20 min. The supernatant liquid is discarded and the solid material is resuspended in 2 l. of water adjusted to pH 4.5. The solid material is again collected by centrifugation and dried by lyophilization. The dried product weighs 89.1 g. The analytical results with respect to protein and phytic acid content for the defatted soy flakes charged to the process, and for the improved soy protein isolate produced by the process are shown in Table I.

Experiment 2. Soy Protein Isolate Process Representative of Commercial Methods

Defatted soy flakes, 1 kg., are mixed with 16 l. of water and adjusted to pH 9.0 with 12.5 N sodium hydroxide. The mixture is stirred with pH monitoring at pH 9.0 for 1 hr. at room temperature (24° C.). Insoluble material is then removed by centrifugation at 3,650 × G for 20 min. and an aliquot of the clarified supernatent liquid, 4 kg., is adjusted to pH 4.5 with 1 N hydrochloric acid. The precipitated soy protein isolate is collected by centrifugation at 3,650 × G for 20 min. The supernatant liquid is discarded and the solid is resuspended in 2 l. of water and adjusted to pH 4.5. The solid material is again collected by centrifugation and dried by lyophilization. The dried product weighs 96.8 g. The analytical values for this soy protein isolate which is representative of commercially available material are shown in Table I.

Experiment 3. Soy Protein Isolate Prepared by the Method of Bolley, et al., U.S. Pat. No. 2,732,395

Defatted soy flakes, 250 g., are suspended in 4 l. of water and adjusted to pH 4.7 with 1 N hydrochloric acid while stirring. Stirring is continued at this pH for 45 min. The insoluble material is then collected by centrifugation at 3,650 × G for 20 min. and the liquid portion is set aside for phytate recovery if desired. The insoluble material is then resuspended in 4 l. of water, and acidification, stirring, and centrifugation is repeated as before. The insoluble material is then resuspended in 4 l. of water and basified to pH 11.0 with 10% aqueous sodium hydroxide and kept at pH 11.0 for 45 min. with constant stirring. Insoluble material is then separated by centrifugation at 3,650 × G for 20 min. and at 5,800 × G for 30 min. and the insoluble material is discarded. The supernatant liquid which has been collected is acidified to pH 4.7 with 1 N hydrochloric acid and the precipitated protein is recovered by centrifugation at 3,650 × G for 20 min., the solid material is resuspended in 2 l. of water at pH 4.5 and again centrifuged as before. The resulting insoluble material is then dried by lyophilization. The dried product weighs 96.3 g. The analytical values relative to the protein and phytic acid composition of this Bolley, et al. soy protein isolate is given in Table I.

Table I

| COMPOSITION OF PROTEIN MATERIALS* | | | |
|---|---|---|---|
| | (1) Defatted Soy Flakes | (2) Improved Low Phytate Isolate | (3) Representative Commercial Isolate | (4) Bolley et al. Isolate |
| Protein g/100 g. solids | 54.6 | 88.9 | 94.3 | 89.1 |
| Ash g/100 g. protein | 13.0 | 2.81 | 3.87 | 4.00 |
| Phytic Acid g/100 g. protein** | 3.39 | 0.133 | 2.22 | 1.75 |
| % removal | — | 96.1 | 34.5 | 48.4 |

*The materials were prepared according to the foregoing experiments identified by the number of the column heading.
**Analytical method of Makower, J. Sci. Food Agr., 20, 82–84 (1969).

According to the foregoing results, 48.4% of the phytic acid components of the soy flakes treated according to the Bolley, et al. method were removed while the process of the present invention resulted in removal of 96.1% of the phytic acid components. The proportion of phytic acid components or "phytin" removed in the soybean example reported in the Bolley, et al. patent was somewhat less than 48.4%. The common commercial method for preparing soy protein isolate represented by Experiment 2 hereof resulted in removal of only about ⅓ of the phytic acid components of the soy flakes treated.

A series of experiments was conducted involving adjustment to various pH values in the alkaline treatment of Step (a) in order to identify the optimal pH for phytic acid removal. The tabulation in Table II correlates pH of alkaline treatment in Step (a) with phytate content of the final isolate.

Table II

| PHYTATE CONTENT (g./100 g. solids) AS A FUNCTION OF TREATMENT pH | |
|---|---|
| PH | Phytate |
| 8.5 | 2.18 |
| 9.0 | 2.13 |
| 9.5 | 2.11 |
| 10.0 | 2.14 |
| 10.5 | 1.45 |
| 11.0 | 0.05 |

Interpolation of these data reveals that forming of the soy protein at a pH of at least about pH 10.6 is desirable to reduce the phytate content below 1 g./100 g. solids in the final soy protein isolate.

Another series of experiments was conducted employing pH 11 for treatment of soybean flakes in Step (a) for various periods of time. The phytate content of the resulting soy protein isolate in each instance was then correlated with extraction time. The results shown in Table III were obtained. A 15 min. extraction period was sufficient to eliminate the phytate.

Table III

| PHYTATE (g./100 g. solids) AS A FUNCTION OF EXTRACTION TIME | |
|---|---|
| Minutes | Phytate |
| 15 | 0.01 |
| 30 | <0.01 |
| 60 | 0.01 |
| 120 | <0.01 |

Experiments to determine the effect of time and temperature on soy extracts at pH 12.0 were conducted. Distilled water preheated to the desired temperature (temperatures of 20°, 30°, 50° and 60° C. were evaluated) and one part of soy flakes per 16 parts of water was mixed therewith and adjusted to pH 12 with 10% sodium hydroxide. The mixture was kept at this temperature with stirring for 2 hours. Half of the extract was then removed and the remainder was kept at the experimental temperature with mixing for a total of 5.5 hours. Immediately after completion of the extraction period in each instance, the flakes were separated from the extract by centrifugation after which the clarified extract was adjusted to pH 7 with dilute hydrochloric acid, frozen, and dried from the frozen state. The dried extracts were then submitted for quantitative determination of the amino acid composition. The results obtained are presented in Table IV. It is evident that at the higher temperatures and longer time periods, substantial losses of cysteine occur. With respect to the cysteine analytical values tabulated, the ratio of the cysteine values to the glycine values are presented in the last line of the table since glycine is substantially insensitive to destruction under the experimental conditions and thus serves as an internal reference standard relative to the analytical method. There is no significant difference between the cys/gly ratio at the 2-hour and 5.5-hour intervals at 20° C. but at the higher temperatures it is evident that cysteine is lost since the increments between the cys/gly ratio for the two time periods at a given temperature are significant, and become substantial at the higher temperatures. In another experiment conducted in this fashion but employing pH 11 at room temperature (20°-30° C.) and time periods of from 1 hour to 6¾ hours, no significant differences between the cysteine analyses for the vaious extracts were observed.

Table IV

| | REPRESENTATIVE AMINO ACID COMPOSITION OF CLARIFIED EXTRACTS | | | | | | | | | |
|---|---|---|---|---|---|---|---|---|---|---|
| | 20°C. | | 30° C. | | 40° C. | | 50° C. | | 60° C. | |
| | 2 hr | 5.5 hr | 2 hr | 5.5 hr. | 2 hr | 5.5 hr | 2 hr | 5.5 hr | 2 hr | 5.5 hr. |
| Protein g/100 g solids | 59.8 | 56.0 | 58.8 | 64.8 | 64.3 | 67.5 | 62.1 | 58.7 | 60.4 | 61.4 |
| Amino acids g/100 g protein | | | | | | | | | | |
| met | 1.37 | 1.33 | 1.26 | 1.25 | 1.20 | 1.24 | 1.26 | 1.27 | 0.909 | 1.19 |
| cys | 1.28 | 1.06 | 1.00 | 0.943 | 0.700 | 0.441 | 0.430 | 0.364 | 0.255 | 0.302 |
| lys | 5.12 | 3.84 | 5.96 | 6.06 | 3.17 | 3.43 | 5.68 | 5.82 | 5.45 | 5.51 |
| gly | 4.76 | 4.10 | 3.91 | 4.38 | 3.25 | 3.59 | 3.96 | 4.55 | 4.18 | 4.27 |
| cys/gly | 0.270 | 0.276 | 0.256 | 0.215 | 0.215 | 0.123 | 0.109 | 0.080 | 0.061 | 0.071 |

Example 1 is repeated through extraction of the soybean flakes at pH 9 and removal of the spent flakes by means of a centrifuge. In order to ascertain the effect of temperature on the degree of phytate removal when forming the aqueous soy protein solution at pH 10.6-14, the clarified extract at pH 9.0 was divided into six portions and each portion was equilibrated to a different temperature of 5°, 10°, 20°, 25°, or 30° C. The portions were then basified to pH 12 with aqueous sodium hydroxide, kept 15 minutes at the respective temperature at pH 12, and then a 15 ml. aliquot was removed and immediately chilled and kept at 3° C. The remainder of the portion was then centrifuged while being maintained at the specified temperature at 6560 rpm (5250 × G) for 30 min. This effected removal of the insoluble phytate formed at pH 12 at the specified temperature. A 15 ml. aliquot of the supernatant liquid after this second centrifugation was then removed and immediately chilled to 3° C. The two 15 ml. aliquots which had been removed from each portion, one before and one after centrifugation, were then allowed to warm to room temperature while being centrifuged at 550 rpms (70 × G) for 30 min. in conical graduated centrifuge tubes. The volume of precipitate in each tube was then measured and the difference in volume between the two tubes represented the amount of phytate removed by basification to pH 12 and centrifugation at the specified temperature. In this fashion, the data in Table V reflecting temperature dependence of phytic acid removal was determined.

Table V

| TEMPERATURE DEPENDENCE OF PHYTIC ACID REMOVAL AT pH 12 | |
|---|---|
| pH Adjustment Temperature | % Phytic Acid Remaining by Volume |
| 5° C. | 69 |
| 10° C. | 46 |
| 15° C. | 15 |
| 20° C. | 10 |
| 25° C. | 5 |
| 30° C. | 0 |

The effect of phytate content in the protein of the diet on mineral absorption by a mammal was measured in feeding experiments carried out with rats fed diets containing soy protein isolates from which varying amounts of the natural phytate had been removed. For comparison, diets in which the untreated defatted soy flour was used as protein source and in which casein was used as protein source were also included in the experiment. Zinc bioavailability was chosen as the parameter indicative of mineral absorption since zinc absorption is especially sensitive to the presence of phytate in the diet and is readily measured by established techniques. Zinc bioavailability was determined in rats fed diets containing equal amounts of proteins derived from the ingredients listed in Table VI, and from casein. Bioavailability was measured by the balance technique which involves determination of the differences between the dietary zinc ingested and the zinc excreted in the feces during a 14-day test period.

The diets employed contained a surplus of zinc which, in the instance of the defatted soy flakes, was determined by analysis to be inherently present in the flakes. With respect to the other diets, zinc citrate was added to supply a total of 6-7 mg. of zinc per kg. of diet. The soy protein isolates employed as dietary protein ingredients were obtained by a process similar to the present one wherein the phytate was removed from the soy protein by treatment with alkali at a pH of at least 10.6, and having the phytate contents shown in the table. In this instance, after elimination of the phytate from the aqueous soy flour extract by alkaline treatment and filtration, the protein was isolated by an ultrafiltration process rather than by acid precipitation according to the present invention. The table, nevertheless, shows the effect of phytate content on dietary polyvalent metal absorption.

Table VI

| | NUTRITIONAL STUDY | | | |
|---|---|---|---|---|
| Dietary Protein Ingredient | Defatted Soy Flakes | Isolate 30% Phytate | Isolate 10% Phytate | Isolate Phytate Free |
| Protein g/100 g solids | 54.6 | 93.5 | 93.8 | 99.2 |
| Ash g/100 g protein | 13.0 | 3.27 | 2.68 | 2.31 |
| Dietary zinc (mg./kg. of diet) | 14.1 | 6.5 | 8.2 | 5.8 |
| Phytic Acid g/100 g protein | 3.39 | 1.05 | 0.299 | 0[1] |
| % removal | — | 69.1 | 91.2 | 100 |
| % Zinc of Dietary | | | | |

Table VI-continued
NUTRITIONAL STUDY

| Dietary Protein Ingredient | Defatted Soy Flakes | Isolate 30% Phytate | Isolate 10% Phytate | Isolate Phytate Free |
|---|---|---|---|---|
| Zinc Absorbed | 61.5 | 70.9 | 85.4 | 86.9 |

[1]none detected

It is evident that when the phytate content of the soy protein isolate is reduced by 70% from that present in the defatted flakes, by 90%, and finally when no detectable phytate is present, that the zinc absorption increases. The optimal effect appears to be reached for the diet having 90% of the original phytate removed and that this represents a significant improvement over the zinc absorption observed when using an isolate having 70% of the original phytate removed. In the control experiment conducted in the same fashion employing casein as protein source, casein was found to make possible the absorption of 85.7% of the dietary zinc by the rats, which is substantially the same as for the present soy protein isolate having from 90 to 10% of the phytate removed.

Experiment 4. Formulation of Soy Milk

The soy protein isolate produced by the process of Experiment 1, 50 g., is suspended in 500 ml. of water and then dissolved therein by adjustment to pH 7.0 with 10% aqueous sodium hydroxide solution. The following ingredients are then suspended or dissolved in this solution and the resulting suspension is homogenized by mechanical homogenization.

| | |
|---|---|
| Corn oil | 52.5 g. |
| Corn syrup solids | 15.6 g. |
| Sucrose | 60.0 g. |
| Milk salts | 13.0 g. |
| Magnesium chloride | 1.3 g. |
| Carrageenan | 0.75 g. |
| Lecithin | 6.0 g. |
| Water, q.s. | 1500 g. |

The homogenized product is then pasteurized and bottled for sale under refrigerated conditions in the dairy case or it is canned and heat sterilized.

The functional advantage of the soy protein isolate of the present invention when incorporated into a liquid dietary product as described in Experiment 4 is reflected by measurement of the sedimentation index and nitrogen solubility index of solutions thereof and comparing them to those obtained with a commercial isolate powder (Edi-Pro A, Ralston Purina Company, St. Louis, Mo. 63188) believed to be prepared by a process similar to Experiment 2. The emulsion stability index was determined on a soy milk similar to that of Example 4 from which the carrageenan and lecithin were omitted. The results are shown in Table VII.

Table VII
FUNCTIONAL PROPERTIES

| Sample | Sedimentation Index (g.) | Nitrogen Solubility Index | Emulsion Stability Index (28 days) |
|---|---|---|---|
| Experiment 5 | 0.63 | 97 | 35 |
| Experiment 5 liquid* | 0.33 | 100 | 38 |
| Edi-Pro A | 9.84 | 57 | 30 |

*After heat treatment at 138° C/1 min., but prior to drying

These values illustrate the superior aqueous solubility of the present soy protein isolate. A substantial improvement in physical stability relative to sediment formation and protein solubility of a soy milk such as is illustrated in Experiment 4 is achieved with the soy protein isolate prepared by the present process.

The sedimentation index in the foregoing comparison was determined as follows.

1. The liquid sample is adjusted to a protein concentration of 5% by weight.
2. A 45 g. aliquot is placed in a tared centrifuge tube.
3. The aliquot is spun at 27,500 × G for 15 minutes at 18° C.
4. The supernatant liquid is decanted and the tubes inverted and drained on a towel for 1 min.
5. The tubes are weighed and the weight of sediment is determined.
6. Results are expressed as grams of sediment per 45 g. of 5% protein solution.

The nitrogen solubility index in the foregoing experiment was determined as follows.

1. Dissolve the soy protein isolate in water at 2.5% by weight of solids.
2. Adjust to pH 7 and stir for 25 min.
3. Place 25 ml. in a 50 ml. centrifuge tube and centrifuge 20 min. at 5,200 rpm.
4. Filter the supernatant liquid through Whatman No. 1 filter paper and assay the filtrate for protein using the Lowry procedure, Jour. Biol. Chem., 193, 265 (1951).
5. The nitrogen solubility index is expressed as a NSI = % protein in filtrate divided by % protein in original sample multiplied by 100.

The emulsion stability index was determined as follows.

1. Draw up ca. 20 ml. of product into a syringe and force most of its back out a couple of times to remove the air in the syringe. Fill the syringe to the 2 oz. mark.
2. Place the filled syringe, point down, in a support rack.
3. Several syringes can be filled from the same can but some product must be retained for fat analysis of the product before storage. This "before storage" sample is called the initial sample and reflects the fat concentration of the product with a homogeneous dispersion.
4. At the end of the storage time the syringe is taken out of the 37° C. storage chamber. By holding the syringe upright and at eye level, the product defects can be observed and noted. Serum, for instance, is a zone toward the bottom of the syringe, usually of reduced solids and appears "thinner."
5. Push out all but the top 10 ml. of test soy milk sample.

This remainder is to be saved for duplicate fat analysis.

6. Calculation of results —

$$ESI_{days\ of\ storage} = \frac{\text{Initial fat \%}}{\text{Time period fat \%}} \times 100$$

7. Expression of results — "$ESI^7 = 85$" means: Emulsion Stability Index for product stored at seven days equals 85.
8. Interpretation of results — As the Fat accumulates at the top of the syringe, the ESI will drop.
   Example:
   Initial homogeneous value = 7%
   Value at top after 14 days = 12%
   $ESI_{14} = (7/12) \times 100 = 58$

Experiment 5. Neutralized Low Phytate Soy Protein Isolate

Defatted soy flakes 50 lbs. and 800 lbs. of tap water at 70° F. were mixed with thorough agitation, and sufficient 50% aqueous sodium hydroxide was added to the mixture to adjust the pH to pH 11.6. A 30-min. period for extraction at pH 11.6 was allowed. The spent flakes were then removed by means of a desludging centrifuge and the light liquid stream comprising the aqueous solution of soy protein was clarified by further centrifugation in a clarifying centrifuge. The clarified extract was then adjusted to pH 4.6 by the addition of 1 N hydrochloric acid. The precipitated soy protein was collected by means of a desludging centrifuge and the isolated curd was transferred to a large vessel and washed with approximately 50 gal. of tap water at 70° F. The curd was again recovered by means of a desludging centrifuge and then mixed with sufficient tap water to provide a slurry having 5-7% by weight of solids and sufficient 50% aqueous sodium hydroxide was added thereto to adjust to pH 7.0. The curd was thereby dissolved in the solution which was then heated by direct steam injection to 280° F. (138° C.) for 1 min., cooled, and then concentrated to one-half its original volume and spray dried to yield the neutralized form of the low phytate soy protein isolate of the present invention. This product exhibits improved functional qualities relative to one prepared as described, but omitting the heating step at 138° F. for 1 min.

What is claimed is:

1. The process for preparing a soy protein isolate having low phytate content which comprises in sequence the steps of:
   (a) forming an aqueous solution of soy protein having a pH within the range of pH 10.6 to pH 14 at a temperature in the range of 10°–50° C. during a period sufficient to render phytates and phytic acid insoluble but insufficient to degrade said soy protein, said soy protein being obtained by aqueous extraction at a pH in excess of the isoelectric value of the soy protein of defatted particulate soybean which has not previously been treated with acid;
   (b) separating insoluble material including phytates and phytic acid from said solution to yield a clarified extract containing dissolved protein and dissolved carbohydrate;
   (c) acidifying acid clarified extract to a pH within the isoelectric range of from about pH 4 to about pH 5 thereby precipitating soy protein; and
   (d) separating said precipitated soy protein from said clarified extract.

2. The process of claim 1 wherein said soy protein after separation from said clarified extract in Step (d) is dried.

3. The process of claim 1 wherein said soy protein after separation from said clarified extract in Step (d) is formed into an aqueous solution at a pH in excess of the isoelectric range of said soy protein and the resulting solution is dried.

4. The process of claim 1 wherein said soy protein after separation from said clarified extract in Step (d) is formed into an aqueous solution at a pH in excess of the isoelectric range of said soy protein and the resulting solution is combined with additional nutritional ingredients to form a liquid dietary product having improved nutritional value and physical stability relative to a similar product prepared from dried soy protein isolate.

5. The process of claim 1 wherein Step (a) is carried out at a temperature in the range of about 15° to about 30° C.

6. The process of claim 3 wherein said aqueous solution prior to being dried is heated at a temperature in the range of from 60° to 175° C. for a period of sufficient to
   (i) improve the protein efficiency ratio of said soy protein, or
   (ii) improve the functionality of said soy protein as measured by sedimentation index, nitrogen solubility index, or emulsion stability index.

7. The process of claim 6 wherein said temperature is in the range of from 60° to 140° C. and said period is from 45 seconds to 30 minutes.

8. The process of claim 6 wherein a temperature in the range of 100° to 140° C. for a graded period of about 10 minutes to 1 minute is employed.

9. The process of claim 4 wherein said soy protein after forming into an aqueous solution is heated at a temperature in the range of from 60° fo 175° C. for a period sufficient to
   (i) improve the protein efficiency ratio thereof, or
   (ii) improve the functionality thereof as measured by sedimentation index, nitrogen solubility index, or emulsion stability index.

10. The process of claim 9 wherein said temperature is in the range of from 60° to 140° C. And said period is from 45 seconds to 30 minutes.

11. The process of claim 9 wherein a temperature in the range of 100° to to 140° C. for a graded period of about 10 minutes to 1 minute is employed.

12. The process of claim 1 wherein in Step (a) said soy protein is obtained by aqueous extraction of defatted particulate soybean at a pH within the range of pH 7 to pH 9.

13. The process of claim 1 wherein sodium hydroxide or potassium hydroxide is employed to form said aqueous solution of soy protein having pH 10.6 to pH 14 in Step (a).

14. The processor of claim 1 wherein in Step (a) said aqueous solution of soy protein has a pH within the range of pH 11 to pH 12.

15. The process of claim 1 wherein said pH in Step (c) is within the range of about pH 4.5–4.7.

16. The product produced by the process of claim 1.
17. The product produced by the process of claim 2.
18. The product produced by the process of claim 3.
19. The product produced by the process of claim 4
20. The product produced by the process of claim 5.
21. The product produced by the process of claim 6.
22. The product produced by the process of claim 9.
23. The product produced by the process of claim 12.
24. The product produced by the process of claim 14.

* * * * *

UNITED STATES PATENT OFFICE
CERTIFICATE OF CORRECTION

Patent No. 4,072,670            Dated February 7, 1978

Inventor(s) Kenneth C. Goodnight, Jr., Grant H. Hartman, Jr. and Robert F. Marquardt It is certified that error appears in the above-identified patent and that said Letters Patent are hereby corrected as shown below:

Claim 1, column 13, line 50, change "acid" to read -- said --.

Signed and Sealed this

Twenty-third Day of May 1978

[SEAL]

Attest:

RUTH C. MASON
Attesting Officer

LUTRELLE F. PARKER
Acting Commissioner of Patents and Trademarks